Dec. 29, 1964 G. W. BERNHEIM 3,163,768
PHOTOELECTRIC SWITCH ADAPTER FOR LAMPS, LANTERNS AND THE LIKE
Filed Feb. 27, 1962 2 Sheets-Sheet 1

INVENTOR.
GEORGE W. BERNHEIM
BY J. B. Burke
ATTORNEY

Dec. 29, 1964    G. W. BERNHEIM    3,163,768
PHOTOELECTRIC SWITCH ADAPTER FOR LAMPS, LANTERNS AND THE LIKE
Filed Feb. 27, 1962    2 Sheets-Sheet 2
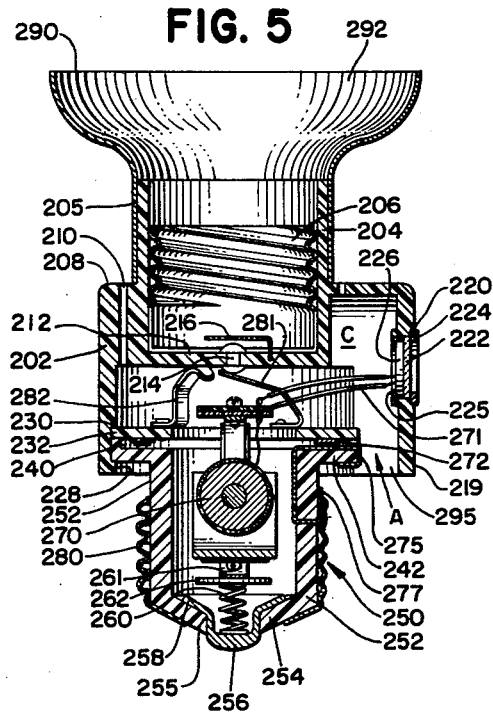
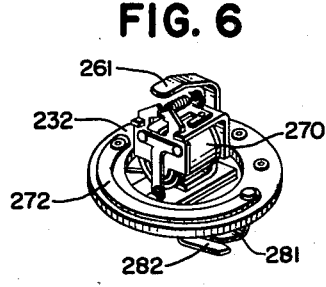
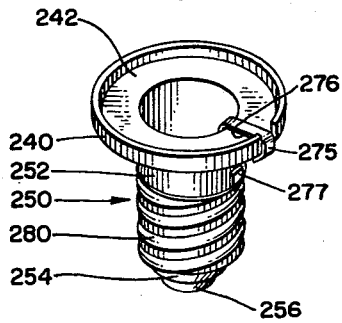
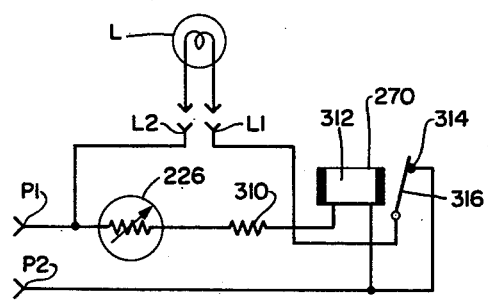
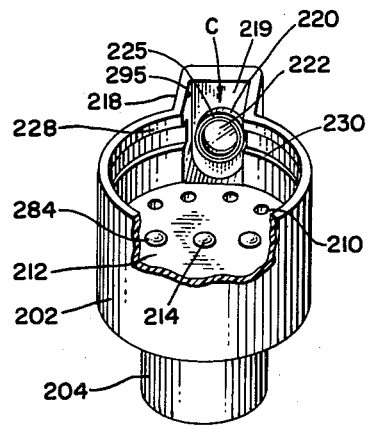
INVENTOR.
GEORGE W. BERNHEIM
BY *J. B. Burke*
ATTORNEY

United States Patent Office 3,163,768
Patented Dec. 29, 1964

3,163,768
PHOTOELECTRIC SWITCH ADAPTER FOR LAMPS, LANTERNS AND THE LIKE
George W. Bernheim, New York, N.Y.
(4499 Henry Hudson Parkway, Bronx, N.Y.)
Filed Feb. 27, 1962, Ser. No. 176,052
6 Claims. (Cl. 250—238)

This invention concerns an improved photoelectric switch adapter for mounting and controlling lamps, lanterns and other load devices. This application is a continuation-in-part of my copending application, Ser. No. 95,334, filed March 13, 1961, now Patent No. 3,056,035, issued September 25, 1962.

In the present invention, there is provided an adapter having a simplified casing struction requiring no external wiring. A lamp or other load device can be screwed into a socket at one end of the casing. The casing has a rotatably adjustable plug which can be screwed into a convenient power supply receptacle. Inside the casing is a photoelectric cell connected in circuit with a suitable relay which turns the lamp on and off responsive to changes in ambient light. The casing is provided with a tubular funnel-like member which acts to shield the photoelectric cell from direct rays of light from the lamp. The tubular member also serves as a reflector of light from the lamp to intensify, concentrate and amplify light emitted usefully from the lamp. The tubular member also serves as a heat radiating device or heat sink to conduct heat away from the casing and keep the photoelectric cell and other internal components of the device in a cool condition.

It is therefore one object of the invention to provide an improved photoelectric adapter particularly for controlling lamps in lighting fixtures but also useful for controlling other types of load devices mounted in conventional electric fixtures.

A further object is to provide a photoelectric switch adapter of the type described with a flaring, funnel-like light and heat reflector and shield.

Another object is to provide a switch adapter of the character described, which employs a sensitive photoconductive type of photoelectric cell, an associated electromagnetic relay and a light filter, all housed in a compact casing including a power plug and lamp socket at opposite ends.

The invention will be best understood from the following description taken together with the drawing, wherein:

FIG. 5 is a sectional view taken on line 5—5 of FIG. 4.

FIG. 6 is a perspective view of an internal ring and electrical components of the adapter, shown inverted.

FIG. 7 is a perspective view of a plug portion of the adapter.

FIG. 8 is a perspective view of the adapter casing in an inverted position.

FIG. 9 is a diagram of an electric circuit employed in the adapter.

Figure 1:
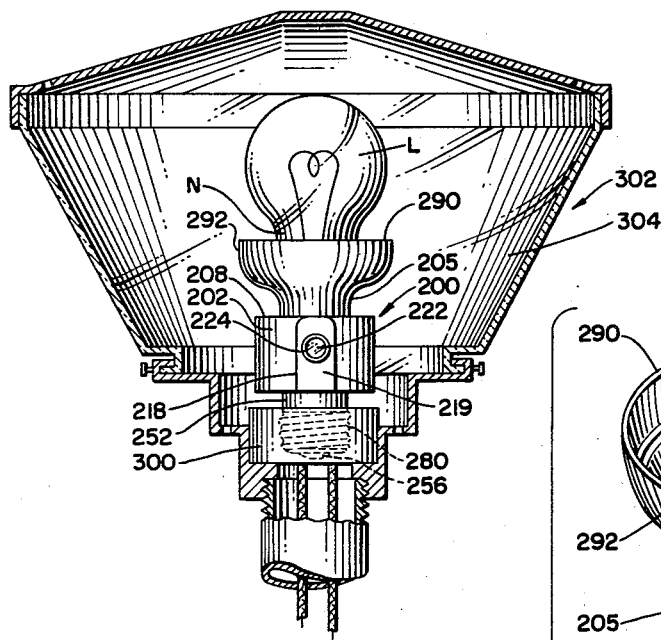
FIG. 1 is a vertical sectional view of a lantern or lamp fixture, with a photoelectric switch adapter embodying the invention, shown in side elevation.
Figure 2:
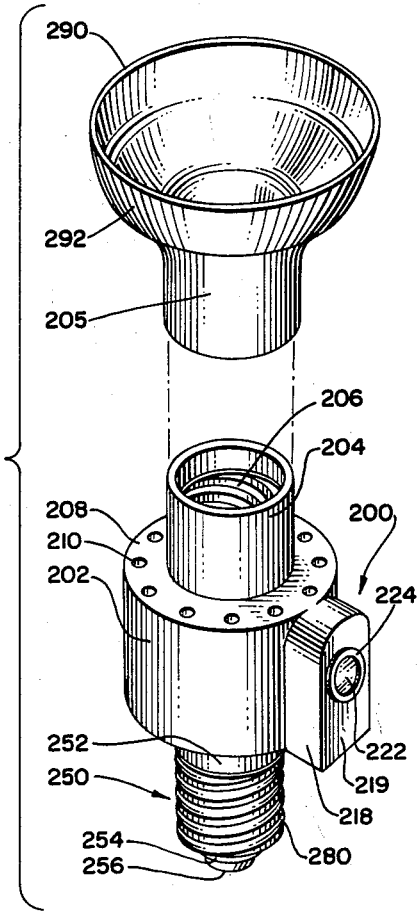
FIG. 2 is an exploded perspective view on a reduced scale of the switch adapter and a reflector.
Figure 3:
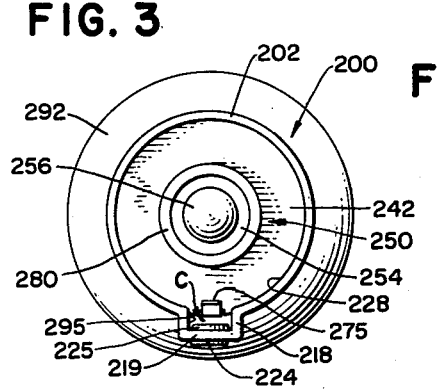
FIG. 3 is a bottom plan view of the assembled adapter and reflector, taken on an enlarged scale.

Referring to the drawing, there is shown the photoelectric switch adapter 200 including a cylindrical casing 202. The casing has an upwardly extending axially aligned neck 204 in which is a threaded metallic insert 206 constituting a socket for receiving the threaded plug portion of a lamp L or other power consuming load device. Around the bottom of neck 204 is an annular top wall portion 208 of the casing. This top wall portion has spaced soles 210 to admit air to the casing and to pass air therefrom. Insert 206 is held by rivets 284 in neck 204.

Inside the casing is a horizontal circular partition 212. A metallic contact element 214 is secured to partition 212. Over element 214 is a leaf spring 216 which is pressed down on element 214 when the plug portion of lamp L or other load device is screwed into the socket insert 206.

The casing has a radial extension 218 in the outer flat wall 219 of which is an opening 220. In this opening is fitted a circular colored glass or plastic filter disk 222 held by an outer ring 224. Fitted in opening 220 behind disk 222 is a cylindrical metal eyelet, frame or housing 225. In housing 225 is supported a cylindrical disk-like photoelectric cell 226.

The casing 202 has an open bottom end formed with a narrow bead 228 at its inner edge. Just above bead 228 and spaced therefrom is an annular shoulder 230. Abutted upwardly against shoulder 230 is an insulated ring 232. Abutted upwardly against the ring is the cylindrical peripheral flange 240 formed at the upper side of an annular wall 242. This wall is part of the plug portion 250 of the adapter 200; see FIGS. 5 and 7.

Plug portion 250 has a depending tubular portion 252 extending downwardly axially from wall 242. The tubular portion 252 terminates in a lower tapered end wall 254 having a central hole 255. In this hole is fitted a metallic cup-like tip 256 having an upper flared rim 258 seated on end wall 254. The tip is slidably disposed in hole 255 and is held yieldably by a coil spring 260 carrying a contact disk 262 and bearing upwardly against a contact spring finger 261 depending from relay 270. The relay is carried by ring 232. The ring is shown in inverted position in FIG. 6 with the relay uppermost. At the underside of the ring, shown uppermost in FIG. 6, is an arcuate fixed contact element 272. This element is contacted by a metalic element 275 carried by the plug portion 250.

Element 275 is seated in a groove 276 formed in annular wall 242 and flange 240. The element 275 is a metal strip which passes through a hole 277 in tubular portion 252 and is soldered or otherwise secured to threaded collar 280 secured to the outer side of tubular portion 252 to define a plug. This plug can be screwed into a power supply socket of a lamp post, wall outlet, power cord or other power supply receptacle.

Figure 4:
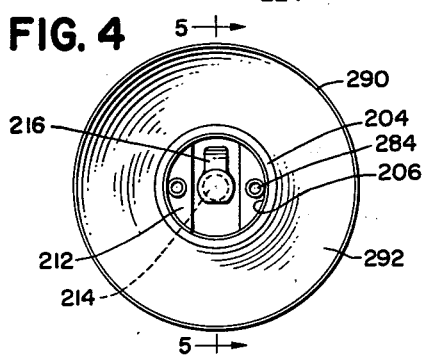
FIG. 4 is a top plan view of the adapter and reflector.

A contact finger 281 carried by ring 232 bears on and contacts the central contact element 214. Another contact finger 282 carried by ring 232 contacts one of rivets 284 securing threaded insert 206 in neck 204; see FIGS. 4, 5 and 6.

Frictionally fitted on neck 204 is the tubular end 205 of a funnel-like reflector 290. This reflector may be a highly polished metal member with an outwardly and upwardly flaring annular bowl 292 at its open end. The neck 204 and bowl 292 of the reflector 290 are concentric with neck N of lamp L and as shown in FIG. 1 are greater in axial length than the axial length of neck to reflect upwardly any downwardly directed light from the lamp which impinges on the reflector. The metal reflector also serves to reflect and conduct heat of the lamp away from the adapter casing.

The photoelectric cell is located in a chamber C below horizontal partition 212. Holes 210 pass through the walls of the casing and are open at the bottom of partition 212 in chamber C. The bottom of the casing extension 218 is open at 295 to pass air upwardly as indicated by arrow A in FIG. 5, into chamber C and then through holes 210 to the exterior of the casing at annular wall portion 208. This circulation of air through the adapter serves to keep its interior in a cool condition, since heat is removed by conduction and convection.

The adapter may be mounted on a power supply socket such as socket 300 of a lantern 302. This lantern may have an outer glass globe 304. When a globe is used and particularly if the globe is made of frosted or translucent glass, then a considerable amount of heat and light may be reflected back to the adapter. The reflector 290 will shield the cell 226 from most of this reflected heat and light. The photoelectric cell 226 is further protected by filter disk 222 from reflected light and heat rays of certain wavelengths. The filter disk substantially excludes yellow rays which are characteristic of artificial or incandescent light of lamps, while passing blue rays which predominate in natural daylight. The filter also corrects or adjusts the sensitivity spectrum of the photoelectric cell to respond to daylight rather than artificial light.

Since the photoelectric cell is adversely affected by being subjected to prolonged heating, the disposition of the cell in the air stream A facilitates cooling, and the housing 225 serves as a heat and light shield around the photoelectric cell.

FIG. 9 illustrates schematically the electric circuit of the device. Photoelectric cell 226 is of photoconductive type employing cadmium sulphide, cadmium selenide or other photosensitive element which is responsive to incident light by changing its internal electrical resistance. One terminal of the cell is connected via a resistor 310 to coil 312 of relay 270. The other terminal of the cell 226 is connected to power supply terminal P1 constituted by collar 280, elements 272, 275 and wire 271. The other terminal of coil 312 is connected to power supply terminal P2 constituted by tip 256, spring 260 and contacts 261, 262. The relay has normally closed fixed contact 314 and movable contact 316. Fixed contact 314 is connected with the relay coil to terminal P2. Contact 316 is connected to load terminal L1 which is constituted by contact finger 281, central contact member 214 and spring finger 216. Load terminal L2 is constituted by the threaded insert 206, rivet 284 and spring contact finger 282. The lamp L is connected to the load terminals L1, L2 by screwing into the upper socket end of the adapter casing as above mentioned.

After lamp L is screwed into the socket insert 206, the adapter can be screwed into socket 300. The tip 256 is loaded by spring 260 which prevents erratic and intermittent contact by taking up any slackness in the frictional fit of the plug portion of the adapter into the power supply socket. After the plug portion is tightly fitted in socket 300, the casing can be turned with respect to the plug portion to orient the photoelectric cell to receive ambient light from a preferred direction, usually north if the lantern is out of doors, or toward a window opening to outside ambient light. As the casing is turned on the plug portion, the arcuate contact 272 on ring 232 slides along contact element 275 on the plug portion 250.

The plug portion 250 fits into the bottom of the casing just above bead 228. This is accomplished by forcing the flange portion 240 of wall 242 passed the bead. The casing is preferably made of plastic material and is sufficiently flexible to permit snapping the wall 242 passed the bead. Thereafter the annular wall 242 turns on the bead in frictional engagement with the inner cylindrical side of the casing. Thus the properly oriented casing remains where set after the casing is turned on the plug portion 250.

In operation of the adapter, when ambient daylight impinges upon the photoelectric cell 226, the electrical resistance of the cell will be low and relay 270 will be energized. This will hold open the normally closed contacts 314, 316 of the relay and the power supply circuit of lamp L will be open keeping lamp L extinguished. At dusk, ambient light reaching the photoelectric cell will be reduced and the resistance of the cell will rise to reduce the current in relay coil 312 and permit contacts 314, 316 to open. The power supply circuit of the lamp will close and lamp L will light. At dawn, ambient light reaching the photoelectric cell will increase in intensity and the resistance of the cell will be reduced to increase current in relay coil 312. The contacts 314, 316 will open to open the power supply circuit of the lamp L which will remain extinguished until dusk when the lamp is again lighted in the manner described above.

The invention makes it possible to control automatically the turning on and off of a lamp or other load device in response to changing ambient light conditions, by means of a small, inexpensive, lighting fixture adapter.

The construction of the adapter is such as to insure long useful life to the internal parts since excessive ambient heat which could adversely affect these parts is effectively drawn away by reflection, conduction and convection. Furthermore the photoelectric cell is shielded against response to light emitted by the lamp or reflected from the lantern globe. The cell is also shielded by the light filter disk from other ambient artificial light rays.

The relay and the photoelectric cell both have inherent time delay characteristics in responding to instantaneous changes in applied current and incident light respectively. These time delay characteristics are desirable since they insure that the adapter circuit will not response to momentary changes in ambient light which might otherwise result in causing the lamp to flash on and off.

What is claimed is:

1. A photoelectric switch adapter for a lamp having a tapered neck and a plug at one end of the tapered neck, comprising a generally cylindrical hollow casing, said casing having an axial neck extension at one end providing a socket for receiving said plug and for supporting said lamp, a plug structure engaged in axial alignment with the casing, said plug structure having an axially extending end for connection to a power supply outlet, said casing having a radial extension provided with a lateral opening, a photoelectric cell exposed at said opening, said casing and radial extension having a common cavity therein, said cell being disposed in said cavity, said casing and radial extension having other openings communicating with said cavity for passing streams of air therethrough for cooling the cell, and a funnel-like reflector having a tubular neck frictionally engaged on said neck extension of the casing, said reflector having a large annular bowl axially aligned with the tubular neck and extending axially away from said casing to surround the neck of the lamp, the axial length of the reflector being greater than the neck of the lamp to shield the photoelectric cell from both light and heat rays emitted by said lamp.

2. A photoelectric switch adapter according to claim 1, further comprising a metal member in the casing supporting the cell and conducting heat away from the cell, said metal member being exposed in said cavity to the streams of air passing therethrough.

3. A photoelectric switch adapter for a lamp, comprising a generally cylindrical hollow casing, said casing having an axial neck extension at one end providing a socket for supporting said load device, a plug structure rotatably engaged in axial alignment with the casing, said plug structure having an axially extending end for connection to a power supply outlet, said casing having a radial extension provided with a lateral opening, a photoelectric cell exposed at said opening, said casing and radial extension having a common cavity therein, said cell being disposed in said cavity, said casing and radial extension having other openings communicating with said cavity for passing streams of air therethrough for cooling the cell, a metal member in the casing supporting the cell, said metal member being exposed in said cavity to the streams of air passing therethrough for conducting heat away from the cell, a ring in the casing, a relay carried by the ring and extending into said plug structure, said relay being connected in circuit with said socket and plug for switching off said lamp when ambient daylight impinges on the photoelectric cell, and for switching on the lamp when sustained ambient daylight impinging on the cell is reduced to predetermined intensity, said casing having an open other end with an internal bead formed therein, said plug structure having an annular wall engaged by the bead inside the casing and holding the plug structure rotatably with respect to the casing, whereby the casing may be turned to orient the photoelectric cell to receive ambient daylight while the plug structure is held stationary in said power supply outlet.

4. A photoelectric switch adapter according to claim 1, further comprising a ring in the casing, a relay carried by the ring and extending into said plug structure, said relay being connected in circuit with said socket and plug for switching off said lamp when ambient daylight impinges on the photoelectric cell and for switching on said lamp when sustained ambient daylight impinging on the cell is reduced to predetermined intensity.

5. A photoelectric switch adapter according to claim 1, wherein said casing has a bead formed on its other end, said plug structure having an annular wall engaged by said bead inside the casing and holding the plug structure rotatably with respect to the casing, whereby the casing may be turned to orient the photoelectric cell to receive ambient daylight while the plug structure is held stationary in said power supply outlet.

6. A photoelectric switch adapter according to claim 3, further comprising an arcuate electrical contact element carried by the ring, and another contact element carried by said annular wall and slidably engaging said arcuate contact element in all relative positions of the casing and plug structure, both of the contact elements being connected in said circuit so that the circuit is closed therethrough.

References Cited by the Examiner
UNITED STATES PATENTS

| | | | |
|---|---|---|---|
| 2,970,223 | 1/61 | Elmer | 250—239 |
| 2,978,591 | 4/61 | Ringger | 250—239 |
| 3,056,035 | 9/62 | Bernheim | 250— 239 |
| 3,093,744 | 6/63 | Tabet | 250—239 |
| 3,116,023 | 12/63 | Van Dusen et al. | 250—239 X |

RALPH G. NILSON, *Primary Examiner.*

ARCHIE R. BORCHELT, *Examiner.*